United States Patent
Harada et al.

(10) Patent No.: US 11,553,491 B2
(45) Date of Patent: Jan. 10, 2023

(54) USER TERMINAL AND RADIO COMMUNICATION METHOD

(71) Applicant: NTT DOCOMO, INC., Tokyo (JP)

(72) Inventors: Hiroki Harada, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/337,564

(22) PCT Filed: Sep. 29, 2017

(86) PCT No.: PCT/JP2017/035387
§ 371 (c)(1),
(2) Date: Mar. 28, 2019

(87) PCT Pub. No.: WO2018/062457
PCT Pub. Date: Apr. 5, 2018

(65) Prior Publication Data
US 2020/0037303 A1     Jan. 30, 2020

(30) Foreign Application Priority Data
Sep. 29, 2016   (JP) .............................. JP2016-192335

(51) Int. Cl.
*H04W 4/00*      (2018.01)
*H04W 48/10*     (2009.01)
(Continued)

(52) U.S. Cl.
CPC ......... *H04W 72/048* (2013.01); *H04L 5/0037* (2013.01); *H04W 48/10* (2013.01); *H04W 72/005* (2013.01); *H04W 72/085* (2013.01)

(58) Field of Classification Search
CPC ... H04L 5/0007; H04L 5/0037; H04L 5/0057; H04W 48/10; H04W 56/001;
(Continued)

(56) References Cited

U.S. PATENT DOCUMENTS

2014/0314072 A1   10/2014 Awad et al.
2016/0057653 A1*  2/2016 Xu ..................... H04W 56/0035
                                                        370/229
(Continued)

FOREIGN PATENT DOCUMENTS

EP      3197225 A1    7/2017
GB      2496383 A     5/2013

OTHER PUBLICATIONS

International Search Report issued for PCT/JP2017/035387, dated Dec. 19, 2017 (5 pages).
(Continued)

*Primary Examiner* — Harun Chowdhury
(74) *Attorney, Agent, or Firm* — Osha Bergman Watanabe & Burton LLP

(57) ABSTRACT

The present invention is designed so that it is possible to communicate adequately depending on user terminal-specific capabilities, in a system where wide frequency bands are supported. A user terminal has a receiving section that receives band information, which indicates a prospective downlink (DL) band, which is a band where a DL signal might be allocated, and/or a prospective uplink (UL) band, which is a band where a UL signal might be allocated, and a control section that configures the DL band candidate and/or the UL band candidate in a user terminal-specific manner based on the band information.

6 Claims, 17 Drawing Sheets

(51) Int. Cl.
  *H04W 72/04*      (2009.01)
  *H04L 5/00*       (2006.01)
  *H04W 72/00*      (2009.01)
  *H04W 72/08*      (2009.01)

(58) Field of Classification Search
  CPC ............ H04W 72/005; H04W 72/048; H04W 72/085; H04W 74/006
  USPC ................................ 370/252, 329, 330, 336
  See application file for complete search history.

(56) References Cited

U.S. PATENT DOCUMENTS

| | | | |
|---|---|---|---|
| 2016/0165640 A1* | 6/2016 | Yang ..................... | H04W 74/08 370/336 |
| 2016/0192433 A1* | 6/2016 | Deenoo .............. | H04W 72/046 370/329 |
| 2017/0034866 A1* | 2/2017 | Wager .................. | H04W 76/27 |
| 2017/0207843 A1* | 7/2017 | Jung .................... | H04B 7/0695 |
| 2017/0230854 A1 | 8/2017 | Harada et al. | |
| 2017/0231011 A1* | 8/2017 | Park ..................... | H04W 74/006 |
| 2017/0311212 A1* | 10/2017 | Yamada ............ | H04W 36/0072 |
| 2017/0311374 A1* | 10/2017 | Chang .................. | H04W 36/36 |
| 2017/0347345 A1* | 11/2017 | Hu ....................... | H04W 72/042 |
| 2017/0367003 A1* | 12/2017 | Zhang .................... | H04W 8/08 |
| 2018/0034599 A1* | 2/2018 | Zhou .................... | H04L 5/0007 |
| 2018/0070369 A1* | 3/2018 | Papasakellariou .... | H04L 5/0053 |
| 2018/0212800 A1* | 7/2018 | Park ..................... | H04L 5/0057 |
| 2018/0352458 A1* | 12/2018 | Kazmi .................. | H04W 24/08 |
| 2019/0014598 A1* | 1/2019 | Yoshimura .......... | H04W 74/006 |
| 2019/0200384 A1* | 6/2019 | Hao .................... | H04W 74/006 |

OTHER PUBLICATIONS

Written Opinion issued for PCT/JP2017/035387, dated Dec. 19, 2017 (4 pages).
ETRI; "Discussion on numerology multiplexing in NR"; 3GPP TSG RAN WG1 Meeting #86 R1-166940; Gothenburg, Sweden, Aug. 22-26, 2016 (5 pages).
ASUSTeK; "Impact on multiplexing multiple numerologies on initial access"; 3GPP TSG RAN WG1 Meeting #86 R1-167673; Gothenburg, Sweden, Aug. 22-26, 2016 (4 pages).
NTT Docomo, Inc.; "Discussion on initial access and mobility for NR"; 3GPP TSG RAN WG1 Meeting #86 R1-167912; Gothenburg, Sweden, Aug. 22-26, 2016 (11 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 17856406.8, dated Mar. 30, 2020 (9 pages).
3GPP TSG RAN WG1 Meeting #86; R1-166636 "Proposals for forward compatibility" NEC; Gothenburg, Sweden; Aug. 22-26, 2016 (2 pages).
Office Action issued in European Application No. 17856406.8; dated Jun. 29, 2021 (5 pages).
Office Action issued in Japanese Application No. 2018-542903; dated Jul. 27, 2021 (6 pages).
Office Action issued in Indian Application No. 201917013331, dated Sep. 6, 2021 (7 pages).

* cited by examiner

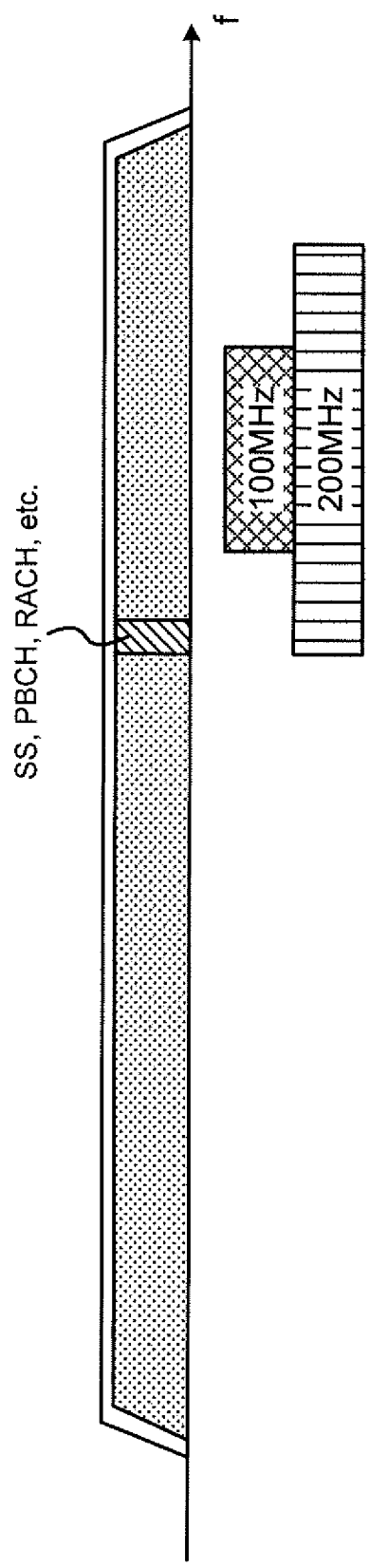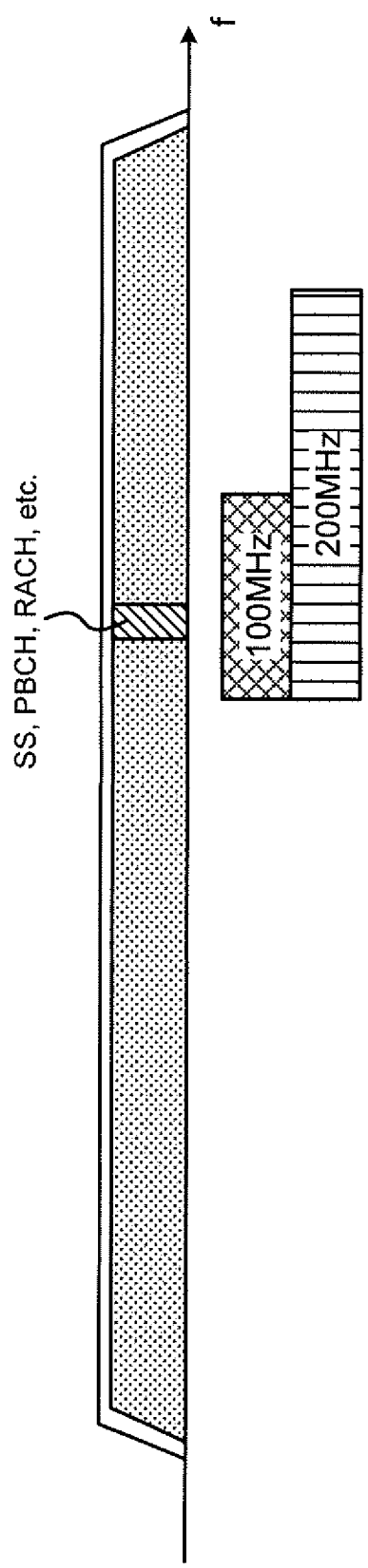

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted to provide wide bands and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple carriers (component carriers (CCs), cells, etc.) is introduced in order to provide wide bands. Every component carrier is configured by using the system bandwidth of LTE Rel. 8 as one unit. In addition, in CA, multiple CCs under the same radio base station (eNB (eNodeB)) are configured in a user terminal (UE (User Equipment)).

Also, in LTE Rel. 12, dual connectivity (DC), in which multiple cell groups (CGs) that are formed by different radio base stations are configured in a user terminal, is also introduced. Every cell group is comprised of at least one cell (CC, cell, etc.). In DC, multiple CCs of different radio base stations are integrated, so that DC is also referred to as "inter-base-station CA (inter-eNB CA)."

In existing LTE systems (for example, LTE Rels. 8 to 13), downlink (DL) and/or uplink (UL) communication are carried out using 1-ms transmission time intervals (TTIs). This I-ms TTI is the time unit for transmitting one channel-encoded data packet, and serves as the unit of processing in, for example, scheduling, link adaptation, retransmission control (HARQ-ACK (Hybrid Automatic Repeat reQuest-ACKnowledgement)) and so on. A TTI of 1 ms is also referred to as a "subframe," a "subframe duration" and so forth.

CITATION LIST

Non-Patent Literature

Non-Patent Literature 1: 3GPP TS 36.300 Rel. 8 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Successor systems of LTE are expected to support wide frequency bands, including high frequencies, and to accommodate user terminals with various signal transmitting/receiving capabilities. The question, therefore, is how to ensure efficient operation of user terminals that have various transmitting/receiving capabilities, in wide frequency bands.

The present invention has been made in view of the above, and it is therefore an object of the present invention to provide a user terminal and a radio communication method that allow adequate communication, depending on user terminal-specific capabilities, in a system where wide frequency bands are supported.

Solution to Problem

According to an example of the present invention, a user terminal has a receiving section that receives band information, which indicates a prospective downlink (DL) band, which is a band where a DL signal might be allocated, and/or a prospective uplink (UL) band, which is a band where a UL signal might be allocated, and a control section that configures the DL band candidate and/or the UL band candidate in a user terminal-specific manner based on the band information.

Advantageous Effects of Invention

According to the present invention, it is possible to communicate adequately, depending on user terminal-specific capabilities, in a system where wide frequency bands are supported.

BRIEF DESCRIPTION OF DRAWINGS

FIGS. 6A and 6B are diagrams to illustrate specific examples of PUSCH and SRS allocations according to example 1 of the embodiment;

DESCRIPTION OF EMBODIMENTS

Future radio communication systems (for example, 5G, NR, etc.) are expected to realize various radio communication services by fulfilling varying requirements (for example, ultra-high speed, large capacity, ultra-low latency, etc.).

For example, for 5G, research is underway to provide radio communication services, referred to as "eMBB (enhanced Mobile Broad Band)," "IoT (Internet of Things)," "MTC (Machine Type Communication)," "M2M (Machine To Machine)," "URLLC (Ultra Reliable and Low Latency Communications)" and so on. Note that M2M may be referred to as "D2D (Device To Device)," "V2V (Vehicle To Vehicle)" and so on, depending on what communication device is used. To fulfill the requirements for various types of communication such as listed above, studies are in progress to design new communication access schemes (new RATs (Radio Access Technologies)).

Furthermore, NR is expected to support wide frequency bands, including high frequencies. To be more specific, there may be frequency bands such as a continuous 800 MHz band, a 2 GHz band and so forth, inside a frequency band of 6 GHz or higher. There may be cases where a wide frequency band like this is used by a plurality of operators or by a single operator.

Note that LTE provides for six patterns of carrier bandwidths (1.4, 3, 5, 10, 15 and 20 MHz), and LTE-A additionally supports providing wide bands based on CA technology, which bundles multiple component carriers. The underlying motive for supporting wide bands like this is that backward compatibility with LTE is taken into account. For example, when a carrier with a 20 MHz or wider bandwidth is provided, legacy terminals (LTE UEs) cannot connect with this wideband carrier, but this problem is solved.

Constraints on carrier bandwidths may include, in addition to the constraint related to backward compatibility mentioned above, at least one of the cost and power consumption of A/D and/or D/A provided in user terminals, baseband processing speed, and FFT size.

Despite these constraints, there is a possibility that user terminals, following the development of devices, have functions (transmitting/receiving capabilities) for supporting wider carrier bandwidths. However, there is a trade-off between incorporating/improving these functions, and cost.

Note that, regarding how to operate user terminals with various transmitting/receiving capabilities in wide frequency bands, which, as mentioned earlier, are anticipated in NR, the following LTE-like method may be possible.

According to this method, a predetermined bandwidth is defined as a system bandwidth, and, in a frequency band in which a wider bandwidth than that can be used, broadbandization is implemented by way of intra-band multi-carrier CA. For example, it may be possible to place a plurality of CCs, each 100 MHz, in a band that is 800 MHz wide. This method makes it possible to spread the load incurred by common control signals and/or others, between CCs.

Figure 1:
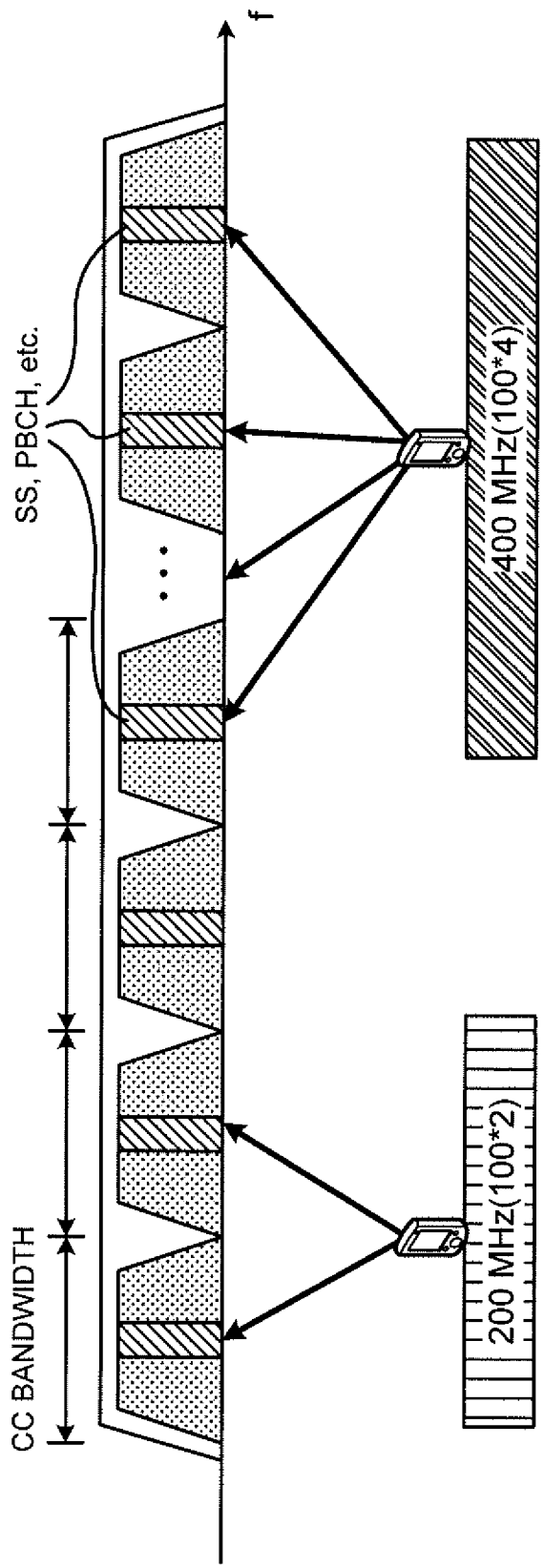
FIG. 1 is a diagram to illustrate a system that provides wide bands by intra-band CA.

For example, referring to FIG. 1, a user terminal that can use a 200-MHz frequency band is assigned two 100-MHz CCs. Also, a user terminal that can use a 400-MHz frequency band is assigned four 100-MHz CCs.

However, assuming that this method is used, if, for example, a user terminal that is capable of transmitting/receiving signals by supporting a wider band than 400 MHz is provided, it is difficult to introduce an additional 400-MHz CC, from the aforementioned perspective of backward compatibility.

Consequently, to accommodate wide bands based on the above-noted and/or other LTE-A-like methods, the number of CCs in CA has to be increased, and this might lead to various problems, including increased scheduling processes in a user terminal (including, for example, deciding in which CCs signals are transmitted), and/or more complex processes for reporting measurement results (measurement reports) and reporting CSI (channel state information) on a per CC basis.

Also, if there is a user terminal that supports CCs only up to 50 MHz, the user terminal cannot access the network unless CCs are divided every 50 MHz. Therefore, the overhead incurred by SS (Synchronization Signal)/PBCH and the like, and the processing load related to the above-noted reporting of measurement results and CSI reporting will increase. Furthermore, in actual operation, it is necessary to prepare performance specifications, test regulations and so on, for combinations and/or pairs that enable CA, for each CC.

In view of the foregoing, the present inventors have focused on the transmitting/receiving capabilities of user terminals, and, in particular, focused on a DL band candidate, which is a band where downlink (DL) signals might be allocated and a UL band candidate, which is a band where uplink (UL) signals might be allocated, and come up with the idea of configuring at least one of these bands in a desired location on the system band, in a user terminal-specific manner. This idea is based on a completely different concept from carrier aggregation, which has been described earlier.

Note that a DL band candidate is a band (PDSCH, PDCCH, etc.) that includes a candidate for allocating downlink (DL) signals to, and its bandwidth is one indicator that shows the UE capabilities of user terminals. A DL band candidate may include bands where signals (common control signals) to be allocated to a common search space, such as the RACH, paging and so forth, are allocated. When data is transmitted, resources that are specified by downlink control signals within the DL band candidate are used. Also, from the perspective of monitoring DL signals, the above DL band candidate may be referred to as a "monitoring band."

Also, a UL band candidate is a band that includes a candidate for allocating uplink (UL) signals to, and its bandwidth is one indicator that shows the UE capabilities of user terminals. When data is transmitted, resources that are specified by uplink control signals within the UL band candidate are used.

Now, an embodiment of the present invention will be described below in detail with reference to the accompanying drawings. In this embodiment, only predetermined bandwidths for transmitting and receiving the initial access/shared control channels will be defined. After a connection is established, the network configures DL band candidates and/or UL band candidates, on a per UE basis, based on UE capabilities. It is possible to say that this embodiment relates to carrier operations that are unique to UEs.

Figure 2:
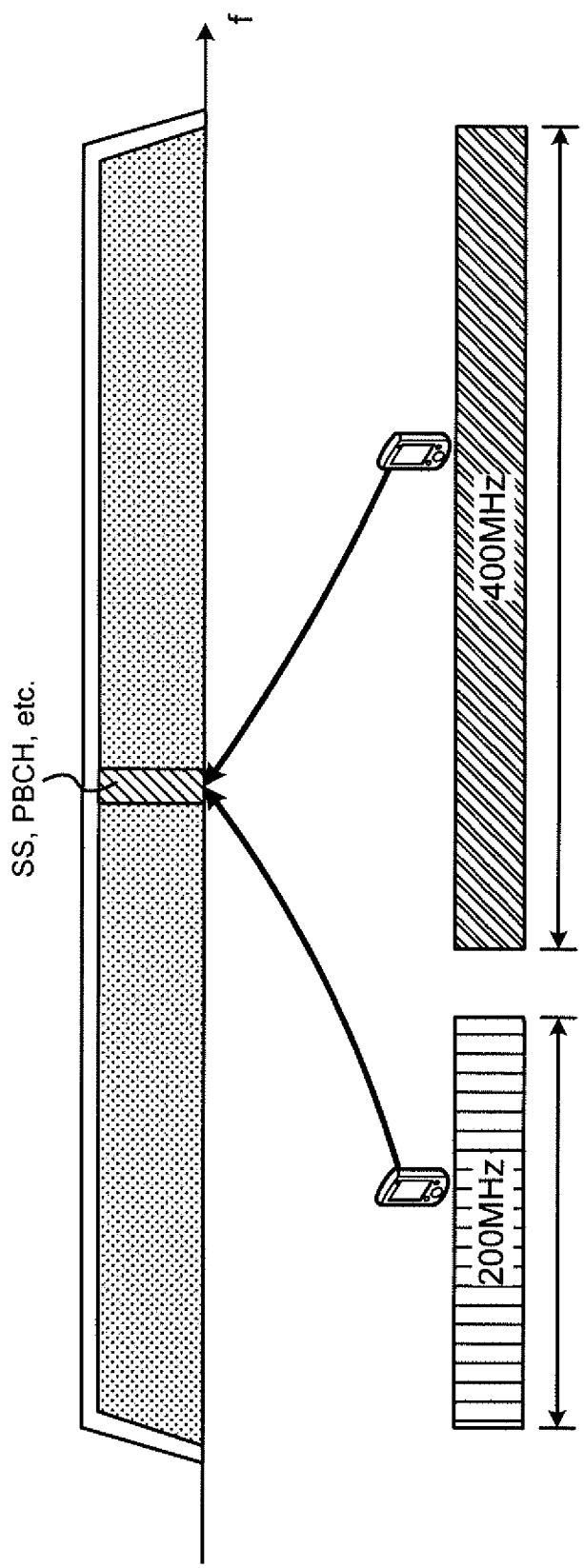
FIG. 2 is a diagram to illustrate prospective bands that are configured in a wide band in a user terminal-specific manner, according to an embodiment of the present invention.

To be more specific, as shown in FIG. 2, SS (Synchronization Signal), PBCH and so on for gaining initial access are transmitted from the network, in a wide band that is 800 MHz wide, for example. A user terminal receives these signals and gains access to the network based on the information received thus. After access is gained, the network configures any one of 100 MHz, 200 MHz and 400 MHz, within 800 MHz, as a DL band candidate and/or a UL band candidate, depending on the UE's capabilities.

According to this embodiment, the network can configure DL band candidates and/or UL band candidates flexibly, based on UE capabilities, so that forward compatibility is ensured.

Examples of the above embodiment will be described briefly first, and then will be explained in detail.

Example 1

In example 1, a user terminal reports information about a DL band candidate and/or a UL band candidate, to the network, as UE capability information. Based on the information reported, the network commands the user terminal to configure a DL band candidate and/or a UL band candidate from among DL band candidates and UL band candidates. This enables the user terminal to communicate with the network using bands that are individually reserved for the user terminal, without executing multiple control operations per CC, and without paying attention to the system bandwidth. By allowing such system bandwidth-insensitive operations (that is, by allowing operations closed within a DL band candidate and/or a UL band candidates that are configured), even if future development of devices will enable the processing-unit bandwidth to be widened even more, compatibility can still be ensured.

Example 2

In example 2, a user terminal searches for SS on predetermined frequency rasters, and receives PBCH on the resource associated with the raster where SS is detected. After that, the user terminal at least receives system information that is necessary for gaining initial access, performs the random access process, or performs RRM (Radio Resource Management) measurements, on this resource (the same resource as above SS/PBCH).

According to example 2, SS and PBCH are transmitted and received in a limited resource, and, furthermore, at least one of SIB, RACH and measurement RS can be transmitted and received in the above resource. By this means, there is no need to re-tune RF (RF retuning) for every process, so that it is possible to reduce the number of times to re-tune RF. Also, it is possible to reduce the number of RFs to be processed in parallel. Therefore, it is possible to ensure stable operations of the user terminal.

Example 3

According to example 3, resources where user terminals at least detect (receive) common control signals (signals allocated to a common search space) or perform the random access process are configured per individual user terminal or per group comprised of user terminals, based on commands from the network.

According to example 3, it is possible to prevent common control signals and/or RACHs of all user terminals in a wide band from concentrating on specific resources, and spread the load.

Example 4

In example 4, one or more resources for a user terminal for conducting RRM measurements are configured inside a DL band candidate and/or outside the DL band candidate. The user terminal reports whether the user terminal can perform measurements with or without measurement gaps in one or more resources that are configured, as its UE capabilities, to the network. Here, providing measurement gaps means stopping transmission and/or receipt of data for measurements.

If there is a user terminal that does not require measurement gaps, there is no need to stop transmitting data when measurements are commanded, so that scheduling can be made accordingly. On the other hand, if there is a user terminal that requires measurement gaps, scheduling can be made on the premise that data transmission can be stopped, and therefore scheduling can be made adequately for all user terminals. Also, if a resource that is suitable for a user terminal is found outside a DL band candidate that has been configured once, it is possible to re-configure (switch) the DL band candidate.

(Details of Example 1)

Next, the method of configuring and identifying UE-specific carriers according to example 1 will be described in detail with reference to the accompanying drawings.

<Reporting of UE Capability Information>

A user terminal reports information about the maximum bandwidth for a DL band candidate and/or the maximum bandwidth for a UL band candidate to the network, as its UE capability information. As mentioned earlier, the network reports band information for configuring a DL band candidate and/or a UL band candidate to a user terminal, based on UE capabilities. The user terminal configures a DL band candidate and/or a UL band candidate based on this band information.

Here, the band information may include the bandwidths and/or the locations of prospective bands (a DL band candidate and/or a UL band candidate). Also, the maximum bandwidths reported in the UE capability information from the user terminal and the bandwidths reported in the band information from the network need not be the same. Also, the "locations" reported from the network to the user terminal may only be information that points to locations on the system band.

Also, if the band information only shows bandwidths, the user terminal configures prospective bands based on rasters that are reported or configured in advance. If the band information only shows locations, the user terminal configures prospective bands based on bandwidths that are reported or configured in advance.

The maximum bandwidths of a DL band candidate and a UL band candidate may be reported from the user terminal to the network in a set, as one piece of UE capability information, or may be reported as individual pieces of UE capability information. Also, the user terminal may report only the largest of prospective bandwidths, or report a set of multiple bandwidths that can be switched dynamically (multiple bandwidths that operate in bands that are so-and-so MHz wide, and that can be switched on a dynamic basis). For example, by selecting resources that show good communication states by switching the operation band dynamically (by switching the operation band dynamically based on UE traffic), it is possible to save power. In addition, it is also possible to save power by adjusting configurations so that signals need not be received at the maximum rate at the maximum bandwidth.

<Reporting of Band Information>

The network reports band information in one of the following ways:

(Report 1) The network reports one piece of band information to each UE by higher layer signaling;

(Report 2) The network configures a number of prospective bandwidths by higher layer signaling, and switches between these prospective bandwidths by L1/L2 signaling (DCI or MAC) (which corresponds to the above-mentioned dynamic switching); and (Report 3) The network broadcasts a number of prospective bands as system information, and reports one of the prospective bands by high layer signaling or L1/L2 signaling. For example, if the system band is 800 MHz, the network reports the leftmost 100 MHz, the next 200 MHz, or the next 400 MHz.

Figure 3:
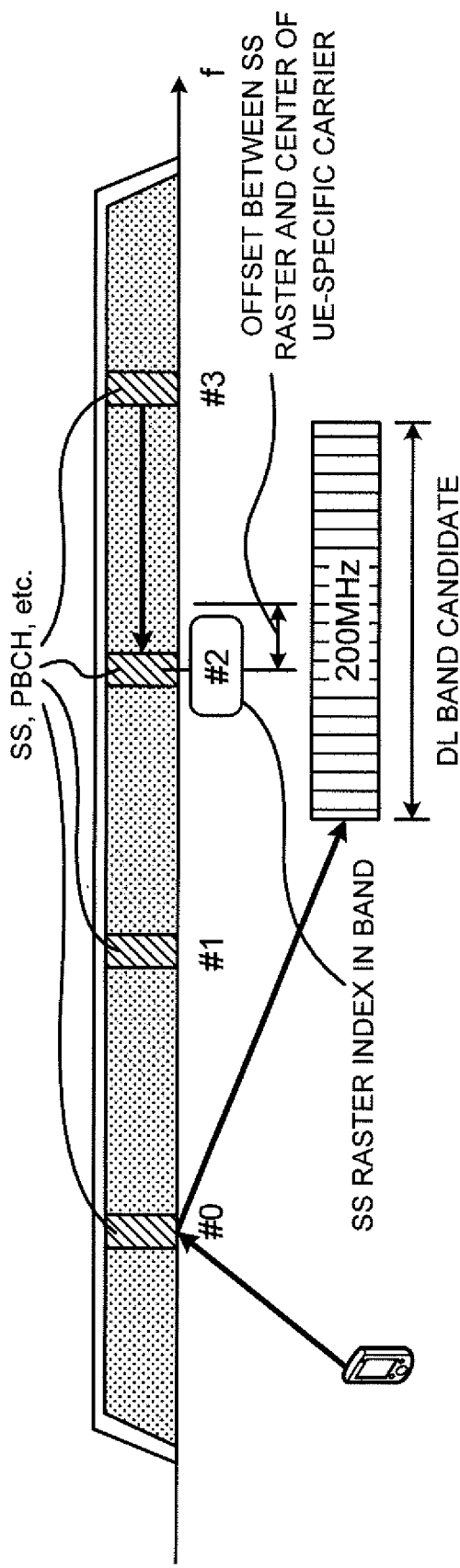
FIG. 3 is a diagram to illustrate how to report a prospective band by using a SS raster index, according to example 1 of the embodiment.

Also, the locations of prospective bands in the above band information can be reported in one of the following ways:

(Report 4) SS raster indices in a band, the relative offset between a PRB on an SS raster and the center PRB of a UE-specific carrier (which may be based on the location where SS is detected), and the number of PRBs (width) in the monitoring band may be used (see FIG. 3).

For example, when the bandwidth is as wide as 800 MHz, there may be SSs transmitted elsewhere, but if every SS is assigned a raster index, it might suffice to report offsets with respect to these raster indices. For example, referring to FIG. 3, assuming that initial access is completed in raster #0 and communication is carried out in raster #2 that follows, if this offset is reported by way of reporting the number of PRBs, a large number of bits would be required. However, according to report 4, it is possible to reduce the number of bits more than when the number of PRBs is reported.

Also, instead of the number of PRBs, the number of PRB groups, the index of a predetermined pattern and/or the like may be reported.

Figure 4:
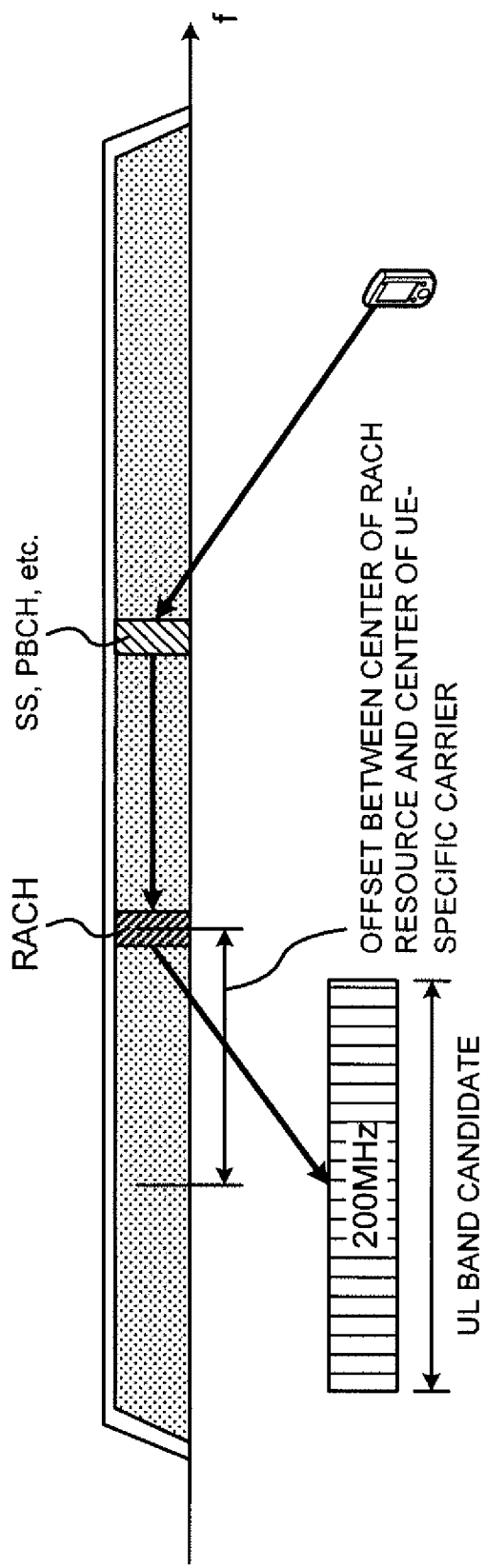
FIG. 4 is a diagram to illustrate how to report a prospective band by using a SS raster index, according to example 1 of the embodiment.

(Report 5) The relative offset of the center PRB of a UE-specific carrier with respect to a predetermined PRB in the resource where random access has been made, and the number of PRBs in the monitoring band (see FIG. 4) may be used. According to report 5, it is possible to change the random access resource on a regular basis. Note that the band for random access is reported as system information.

<UL Band Candidate Width>
<<PUSCH and SRS>>

PUSCH and SRS in a UL band candidate will be explained below. For PUSCH and SRS, the network allocates UL resources based on the maximum bandwidth in which UE is capable of transmission, reported as UE capability information. When this takes place, prospective UL-allocated resources may be reported through higher layer signaling.

Note that the UL resources to be used may be reported by UL grants in PDCCH. However, if the system bandwidth is a wide band, there is a possibility that the UL grant bits for designating UL resources may run short. Consequently, it is preferable to configure a UL band candidate width based on the number of bits that can be used for UL grants.

Figure 5:
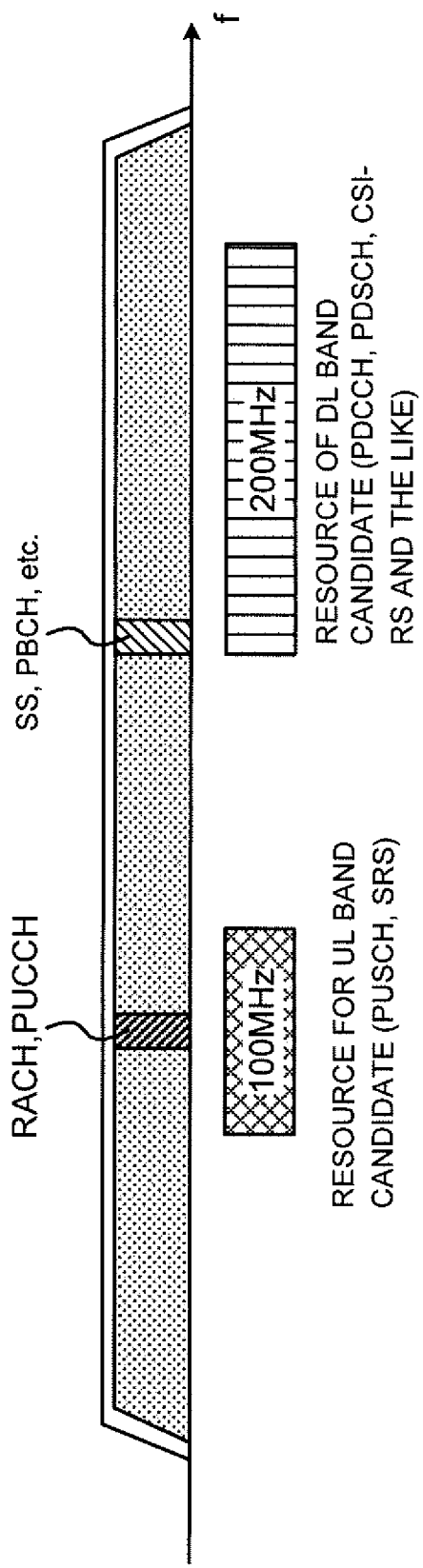
FIG. 5 is a diagram to illustrate a specific example of PUSCH and SRS allocation according to example 1 of the embodiment.

Specific examples of PUSCH and SRS allocations may include:

(Example 1) PUSCH and SRS in a UL band candidate may be allocated to different frequency resources (FDD-like) than DL (FIG. 5), or may be allocated so as to overlap (partly) with DL on the same resources (TDD) (FIGS. 6A and 6B). However, the UL band candidate and the DL band candidate may be the same band if there is no higher layer signaling (or when there is an explicit command);

(Example 2) The center of prospective UL-allocated resources may be reported by using the offset from the center of DL resources, or may be reported by using the offset from the center of SS/PBCH resources or RACH resources; and (Example 3) By defining the association with RACH resources and/or others in the specification (by aligning the centers, for example), it is not necessary to separately report the central resource location (only the maximum UL bandwidth has to be reported).

<<PUCCH>>

Next, PUCCH in a UL band candidate will be explained. For example, a scheduling request and/or CSI are transmitted in a state in which there are no corresponding DL resources, and so it is preferable to provide rules in advance as to which resources are used to send these.

The following transmission methods can be applied to SR and CSI:

(Option 1) SR and CSI can be transmitted using a predetermined resource on a frequency resource where common control signals such as SS/PBCH are monitored;

(Option 2) SR and CSI can be transmitted using a resource on a frequency resource configured by higher layer signaling (which is different from or the same as the DL band candidate resource); and (Option 3) SR and CSI can be transmitted using a predetermined resource on a frequency resource configured by broadcasting of PBCH, SIB, and so forth.

The following transmission method can be applied to HARQ-ACK/NACK. HARQ-ACK/NACK can be transmitted using a predetermined resource on the frequency resource allocated to DL (self-contained design), or HARQ-ACK/NACK can be fed back using the last symbol of the same frequency resource as the frequency resource where DL has been received.

(Details of Example 2)

Next, the method of connecting and/or camping on UE-specific carriers according to example 2 will be described in detail with reference to accompanying drawings.

Figure 7:
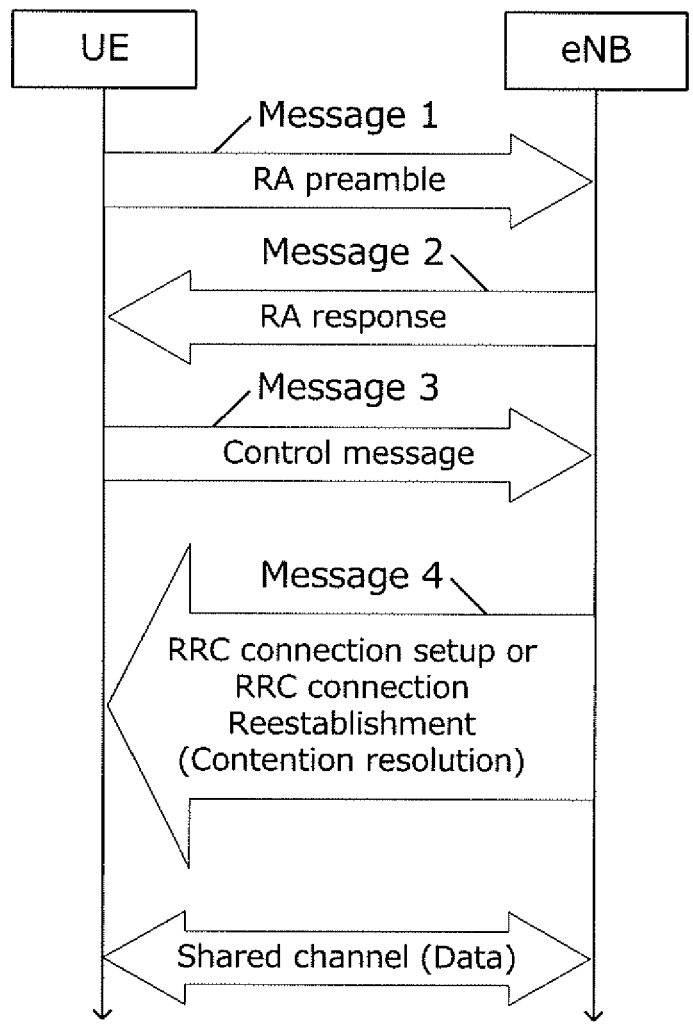
FIG. 7 is a diagram to show existing random access procedures.

A user terminal searches for SS on predetermined frequency rasters, and receives PBCH on the resource corresponding to the raster where SS is detected. After that, the user terminal at least receives system information (SIB) that is necessary to gain initial access, performs the random access process, or performs RRM measurement-related transmission and/or receipt, on this resource. Note that the user terminal can perform the random access process and/or other processes after SS is detected following the existing random access procedures shown in FIG. 7.

The user terminal can receive SIB, perform the random access process, or perform RRM measurements at any frequency in a wide band. That is, the frequency band used to search for SS or receive PBCH is not limiting.

Meanwhile, assuming that the user terminal continues to camp on in idle mode and so on even after initial access is completed, if the frequency band in which the user terminal receives SIB, performs the random access process or performs RRM measurements, and the frequency band where SS/PBCH are located are different, frequencies need to be re-tuned oftentimes between these frequency bands, and the load on the user terminal increases. According to above example 2, it is possible to reduce the number of times to make this retuning, and reduce the burden on the user terminal.

To be more specific, the user terminal transmits/receives SIB, RACH (PRACH, RAR, etc.), measurement RS and so on only on the same predetermined resource as that of SS/PBCH, so that the user terminal can focus on processes on this resource, and processes on the wideband resource for transmitting/receiving data (at least during connected mode). Furthermore, during idle mode, power saving operations focusing only on the resource for monitoring SS/PBCH, SIB, RACH, measurement RS, and so on is also possible.

Also, the resource for monitoring SS/PBCH, SIB, RACH, measurement RS and/or the like may be included in resources in the DL band candidate, or may be configured in non-overlapping resources. This design will be described below.

<Sample UE Design 1>

Figure 8A:
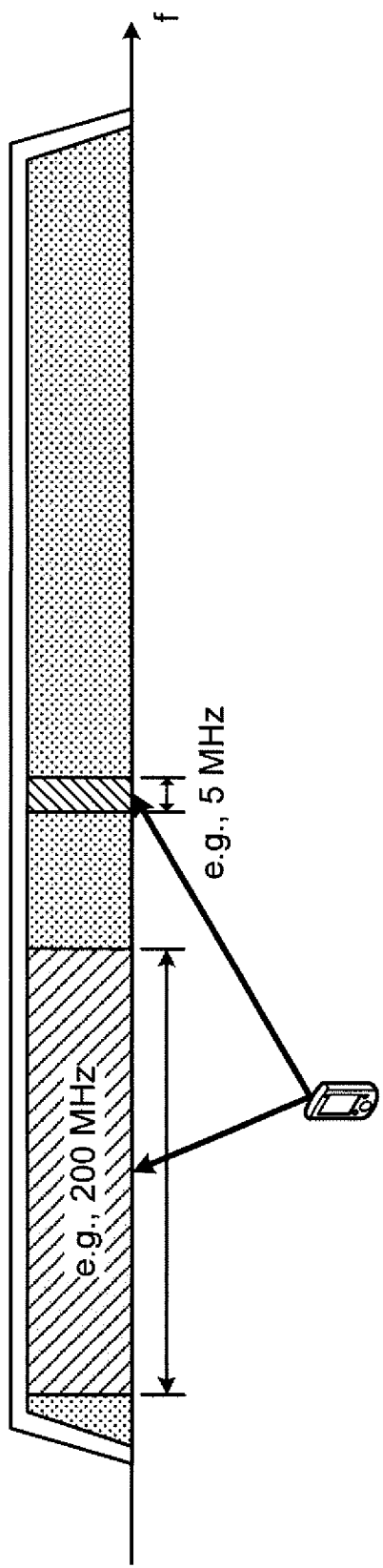
FIG. 8A is a diagram to illustrate a case where, in example 2 of the embodiment, the resource for monitoring SS/PBCH, SIB, RACH, measurement RS and so on is configured in a resource that does not overlap with resources in a DL band candidate.

FIG. 8A shows a design in which the resource for monitoring SS/PBCH, SIB, RACH, measurement RS and so forth is configured in a resource that does not overlap with resources in the DL band candidate. In this case, baseband communication sequences, designed as shown in FIG. 8B, are provided.

Figure 8B:
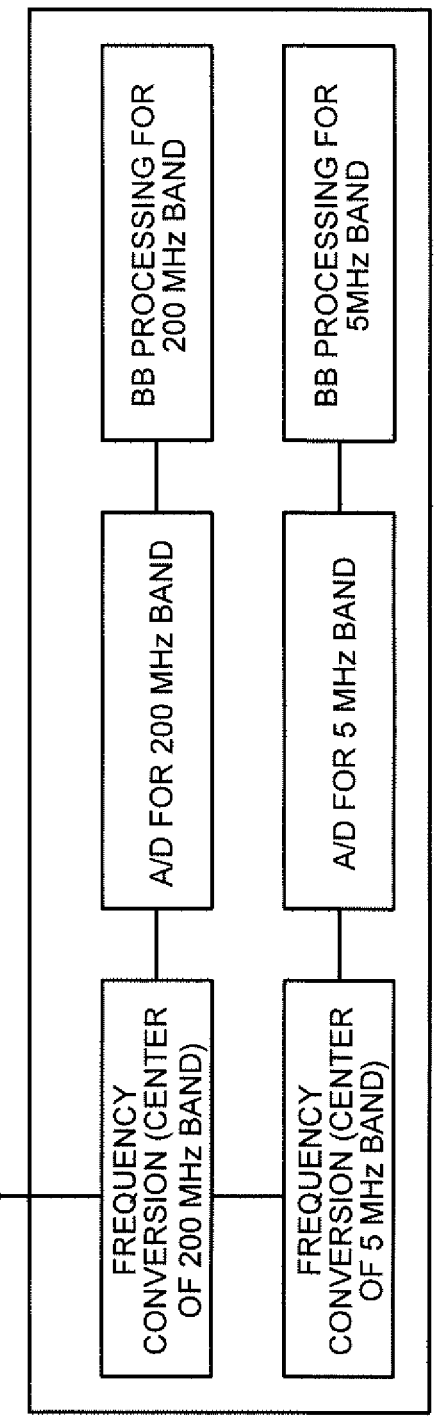
FIG. 8B is a diagram to illustrate a user terminal that communicates based on the allocation of FIG. 8A.

As shown in FIG. 8B, the baseband communication sequence for the 200 MHz band and the baseband communication sequence for the 5 MHz band are provided separately. Each baseband communication sequence is provided with a frequency conversion section, an A/D converter, and a BB (BaseBand) processing section.

The baseband communication sequence for the 200 MHz band is de-activated during idle mode, and functions in all operations except for those operations that take place in the baseband communication sequence for the 5 MHz band. To be more specific, the baseband communication sequence for the 200 MHz functions at least in operations for connected mode, such as DL control/data monitoring, CSI measurements, and so forth.

The baseband communication sequence for the 5 MHz band is always in the on state and functions during SS/PBCH monitoring, and, in addition, functions in at least one of the operation for receiving system information (SIB) that is necessary to gain initial access, the operation for performing the random access process, and the operation for performing RRM measurements.

<Sample UE Design 2>

Figure 9A:
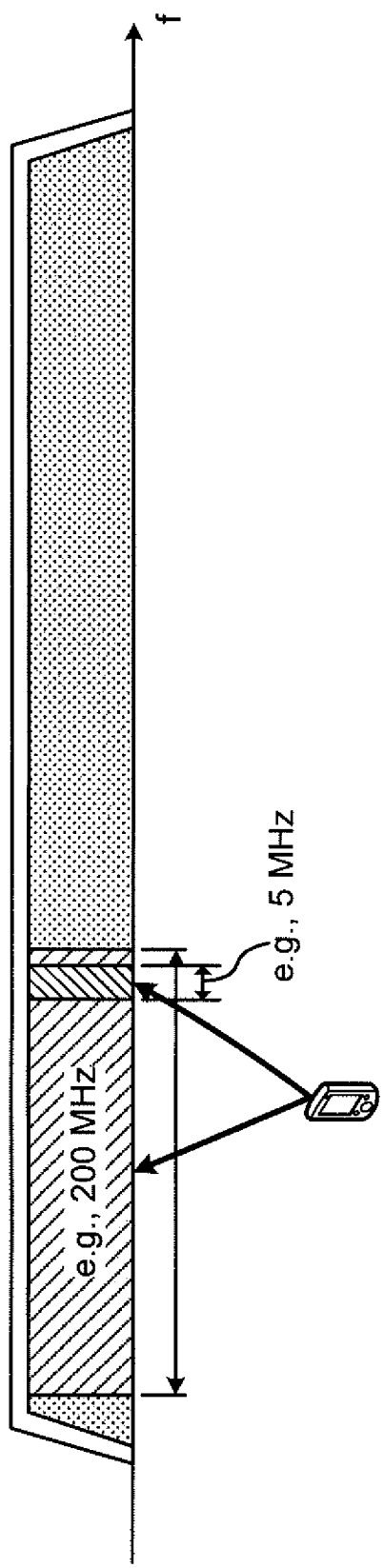
FIG. 9A is a diagram to illustrate a case where, in example 2 of the embodiment, the resource for monitoring SS/PBCH, SIB, RACH, measurement RS and so on is configured in a resource that does not overlap with resources in a DL band candidate.

FIG. 9A shows a design in which the resource for monitoring SS/PBCH, SIB, RACH, measurement RS and so forth is configured in a resource that overlaps with a resource in the DL band candidate. In this case, baseband communication sequences, designed as shown in FIG. 9B, are provided.

Figure 9B:
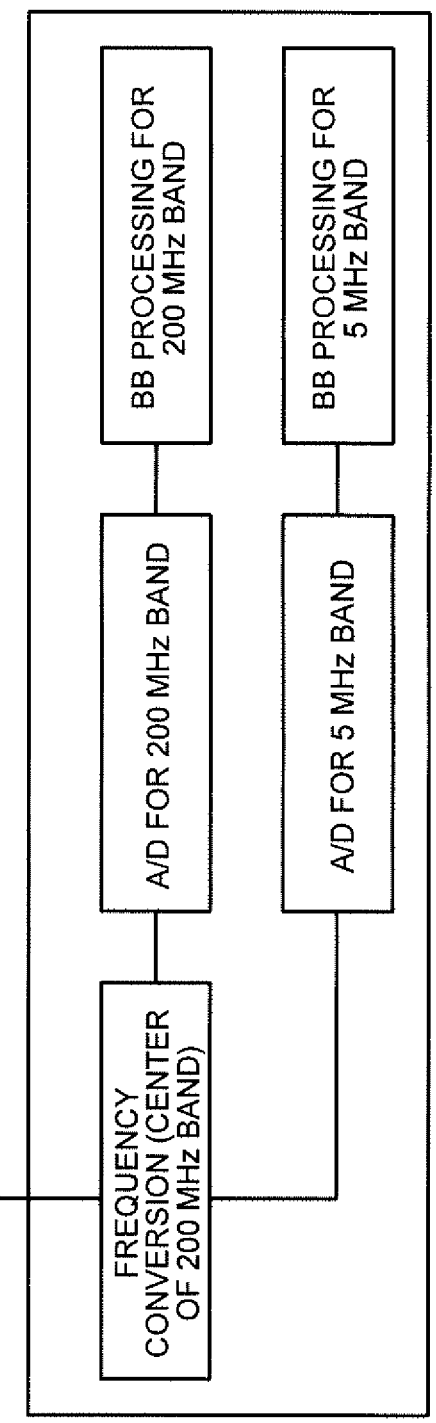
FIG. 9B is a diagram to illustrate a user terminal that communicates based on the allocation of FIG. 9A.

The band for monitoring SS/PBCH, SIB, RACH, measurement RS and so forth is included in the DL band candidate (200 MHz band), so that, as shown in FIG. 9B, the frequency conversion section needs to be provided only for the 200 MHz band. However, the A/D converter and the BB processing section need to be provided in both the baseband communication sequence for the 200 MHz band and the baseband communication sequence for the 5 MHz band, separately.

The A/D converter and the BB processing section for the 200 MHz band are de-activated during idle mode, and function in all operations except for those operations that take place in the A/D converter and the BB processing section for the 5 MHz band. To be more specific, the A/D converter and the BB processing section for the 200 MHz function at least in operations for connected mode, such as DL control/data monitoring, CSI measurements, and so forth.

The A/D converter and BB processing section for the 5 MHz band are activated during idle mode, de-activated during connected mode, and function during SS/PBCH monitoring, and, in addition, function in at least one of the operation for receiving system information (SIB) that is necessary to gain initial access, the operation for performing the random access process, and the operation for performing RRM measurements.

Sample UE design 2 can be made simpler than sample UE design 1. In sample UE design 2, the A/D converter and the BB processing section for the 200 MHz band have to be activated only during connected mode, so that it is possible to reduce power consumption compared to sample UE design 1.

The band for receiving common control signals can be configured in an arbitrary manner so that receipt of SIB, the random access process, and RRM measurements can take place at any frequency in a wide band (see FIG. 8A and FIG. 9A). However, example 2 is designed so that at least system information (SIB) is received, the random access process is performed, or RRM measurement-related transmission and/or receipt are performed in the common control signal receiving band where SS is detected. By this means, it is possible to reduce the number of times to make frequency-retuning, and reduce the burden on the user terminal. Note that it is also effective to receive common control signals in one band during idle mode, as described above with sample UE designs 1 and 2.

(Details of Example 3)

Next, the method of spreading the load incurred by common control signals (RACH, paging, etc.) according to example 3 will be described in detail with reference to the accompanying drawings.

Since the system band is a wide band, it is preferable if there are a plurality of prospective bands for receiving common control signals. For example, if SS is first detected in a band and then this band is set for the band for receiving common control signals afterwards, the flexibility of the system may be damaged. For example, while overhead can be reduced by limiting the resource for transmitting SS/PBCH and/or the like (limiting to one band, resource, etc.), if common control signals are limited to this band (resource), too, the load (for example, RACH, paging and so forth) is concentrated in this band. In particular, RACH and paging increase in proportion to the number of user terminals, so that to the load on this limited band increases as well.

Consequently, it may be possible to move the receiving operation (monitoring operation) to a common control signal receiving band that is different from the common control signal receiving band where the first-detected SS is included. For example, prospective bands for shared control may be configured by the network. In addition, when SS rasters are configured, it may be possible to designate the band for receiving common control signals by using these indices.

To be more specific, the network configures bands (resources) for user terminals to monitor common control signals (common search space) or gain random access, on a per UE basis, or on per UE group basis.

BY allowing a user terminal to use resources other than the resource where the user terminal has first detected SS, to monitor common control signals, gain random access and so on, it is possible to prevent RACH, paging and so forth from concentrating on part of the resources in a wide band.

Figure 10:
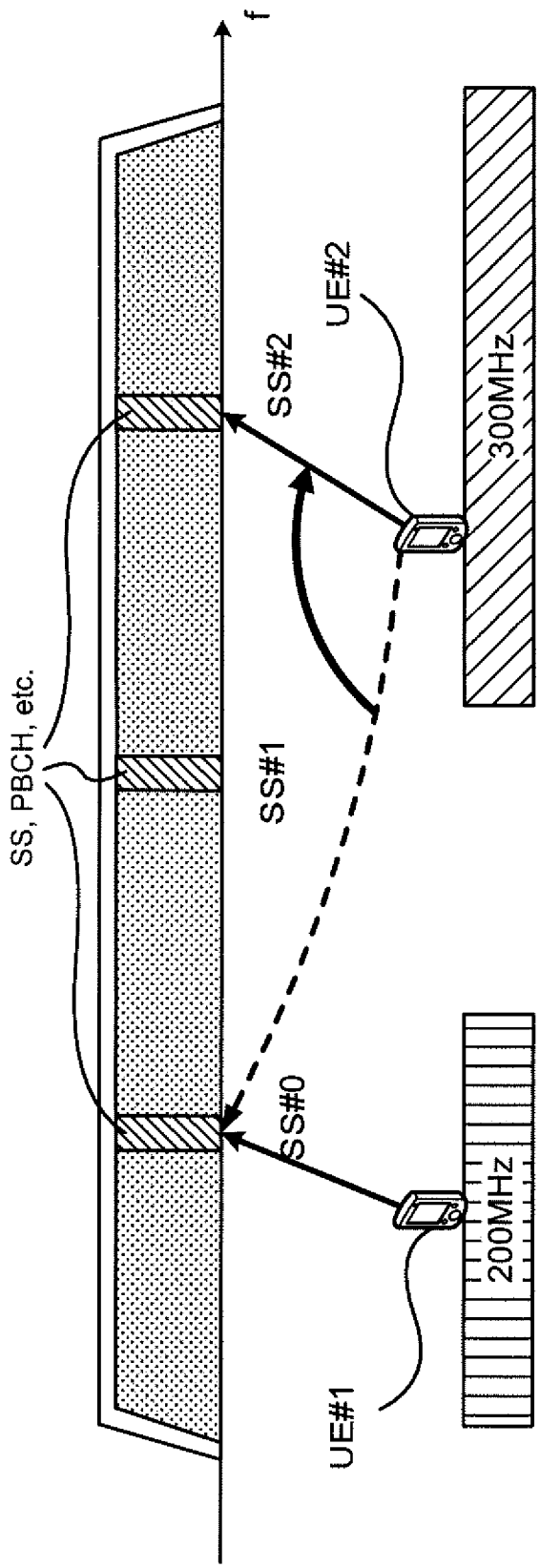
FIG. 10 is a diagram to illustrate the spreading process according to example 3 of the embodiment.

The user terminal may assume that the resource including at least one of SS/PBCH, common control signals, RACH and measurement RS is included in the DL band candidate configured by the network (FIG. 10).

In which resource in the DL monitoring band the user terminal transmits/receives at least one of SS/PBCH, common control signals, RACH, and measurement RS may be configured by the network. Also, the user terminal may search for SS again, in the DL band candidate, autonomously. Alternatively, a resource apart from the resource where the user terminal first detects SS may be configured outside the DL band candidate to transmit/receive at least one of common control signals and RACH.

<Example of Spreading Process for Common Control Signals>

Now, an example of the spreading process for common control signals will be described below with reference to FIG. 10. In FIG. 10, three prospective bands for shared control are configured in a system band.

UEs #1 and #2 search for SS in SS raster #0 and detect an NR cell (step 1). After initial access is completed, for example, DL band candidates are configured in UEs #1 and #2, in accordance with example 1 described above (step 2). As shown in FIG. 10, UE #1 is configured with a 200-MHz band including SS raster #0. Also, UE #2 is configured with a 300-MHz band including SS raster #2.

Here, for UE #2, SS raster #2 is configured as the band for receiving common control signals, according to a command from the network (step 3). To be more specific, UE #2 transmits/receives at least one of SS/PBCH, common control signals, RACH and measurement RS in SS raster #2. This makes it possible to prevent processes for RACH, paging and/or others from concentrating in SS raster #0.

Note that UE #1 can be designed and operate in the same way as sample UE design 2 according to example 2 above. Furthermore, UE #2 is preferably designed in the same way as sample UE design 1.

(Details of Example 4)

Next, measurements for switching DL band candidates according to example 4 will be described in detail with reference to the accompanying drawings.

Prospective bands (DL band candidates and/or UL band candidates) configured in accordance with examples 1 and 3 described above may not always be suitable bands for a user terminal. For example, the degree of interference may vary from resource to resource depending on what environment surrounding cells show (for example, which resource is allocated to which user, and so on). In order to find a band that is suitable for a user terminal, it is preferable to perform measurements at a plurality of points.

To do this, multiple measurement resources are configured inside a DL band candidate and/or outside the DL band candidate. Configuring of multiple measurement resources may be commanded from the network. Alternatively, the user terminal itself may command this. In addition, the network may specify in which resource among a plurality of measurement resources (bands) measurements are to be conducted.

Upon performing measurements using the above measurement resources, the user terminal judges whether measurement gaps need to be provided or not, and reports the judgement result as UE capability information to the network.

One or more measurement resources (bands) may be reported on per user terminal, via higher layer signaling, and configured in each user terminal. Alternatively, a plurality of measurement resources may be broadcast using a broadcast signal. Also, in which measurement resources (bands) measurements are to be conducted may be specified by higher layer signaling or by L1/L2 signaling.

<RRM Measurements in Connected Mode>

A user terminal that is designed the same way as sample UE design 1 according to example 2 reports UE capability information to the effect that measurement gaps are unnecessary, to the network, when performing measurements using measurement resources. For example, if sample UE design 1 according to example 2 applies, given that the baseband communication sequence for the 200-MHz band and the baseband communication sequence for the 5-MHz band are provided separately, it is possible to run operations for the 200 MHz band and operations for the 5 MHz band separately, in parallel (thereby watching two bands simultaneously). Therefore, it is possible to perform RRM measurements to in the wide band by moving the monitoring resource for the 5 MHz band, without stopping processes in the 200 MHz band (without gaps).

Meanwhile, if sample UE design 2 according to example 2 applies, given that basically only one band (200 MHz bandwidth or 5 MHz bandwidth) is monitored, measurements need to be conducted with gaps. Therefore, a user terminal that is designed in the same way as sample UE design 2 reports UE capability information to the effect that measurement gaps are needed, to the network.

Alternatively, the user terminal may report in which bandwidth the user terminal is capable of measurements without measurement gaps, as its UE capability information.

In this way, a user terminal reports whether or not measurement gaps are necessary, to the network, so that it is possible to perform scheduling in a way that is suitable for the design of the user terminal (for example, sample UE design 1 or 2 according to example 2). For example, even if data is transmitted during a measurement gap to a user terminal that requires measurement gaps, the user terminal cannot receive this data. Scheduling can be performed on the network side so as to avoid such a situation, so that the efficiency of scheduling can be improved.

Assuming that there are measurement bands (measurement resources) inside a DL band candidate and/or outside the DL band candidate, not only their frequency locations, but also their measurement bandwidths (the number of resources to use in each measurement band) may be made configurable by the network.

In RRM measurements, the resource for measuring the received power of reference signals (RSRP) from each cell and the resource for measuring total received power including interference (RSSI) may be configured separately. Furthermore, it is also possible to configure multiple resources for measuring only interference from other cells.

RSRP does not vary much regardless of where in a wide band it is measured, because the impact of fading can be smoothed out if the measurement bandwidth is sufficiently large. On the other hand, RSSI changes with every resource, depending on to which resources signals that correspond to currently-accommodated user terminals in each cell are allocated. Consequently, if, for example, a certain user terminal in an adjacent cell is configured in part of the resources in a wide band and generating a lot of traffic here, throughput can be improved by configuring active user terminals in neighboring cells in different resources within the wideband.

<Measurement Bandwidth Based on Mode (Number of Resources to Use)>

From the perspective of idle/connected modes, it may be possible to configure the measurement bandwidth based on these modes.

Figure 11A:
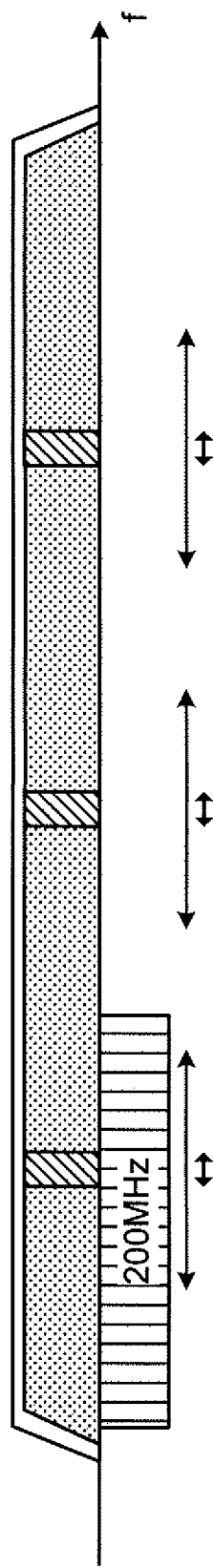
FIGS. 11A and 11B are diagrams to illustrate the configuration of measurement bandwidth according to example 4 of the embodiment.
Figure 11B:
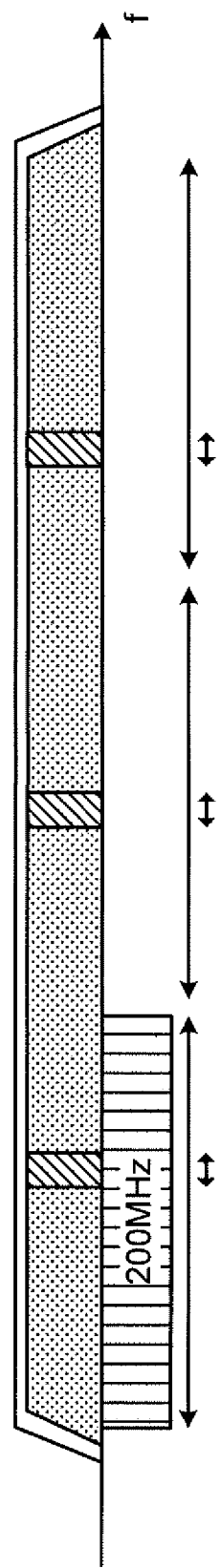

If the measurement RS in idle mode and the measurement RS in connected mode are the same, only the measurement bandwidth may be configured differently between these modes (see FIGS. 11A and 11B). In this case, a user terminal can be designed in the same way as sample UE design 2, and therefore can be designed simple. However, since measurement gaps are required, the above-mentioned UE capability information must be reported. Note that, as for the RS, reference signals like the CRS in LTE can be used.

If the measurement RS for idle mode is different from the measurement RS for connected mode, each measurement resource may be configured separately. In this case, a user terminal can be designed in the same way as sample UE design 1, so that it is possible to run 200-MHz operations and 5-MHz operations separately, in parallel (watching two bands simultaneously), as mentioned earlier. Consequently, it is possible to perform so-called intra-band measurements, by moving from resource to resource within the 5 MHz bandwidth, without producing measurement gaps.

Measurement resources for connected mode (in particular, the resource used in RSSI measurements) may be configured to avoid resources where common control signals are placed. By this means, it is possible to measure the degree of congestion due to data signals in nearby cells.

Furthermore, when the RS for idle mode and the RS for connected mode are different, for example, the CRS for idle mode and the CSI-RS for connected mode may be configured independently. The RSSI measurement in connected mode is to measure the degree of load incurred by CSI-RSs, and, if resources for common control signals are included here, a certain amount of signals are included at all times, which makes it difficult to measure the degree of data interference accurately.

(Radio Communication System)

Now, the structure of a radio communication system according to the present embodiment will be described below. In this radio communication system, the radio communication methods according to the above-described examples are employed. Note that the radio communication methods according to the herein-contained examples of the present invention may be applied individually, or may be applied in combinations.

Figure 12:
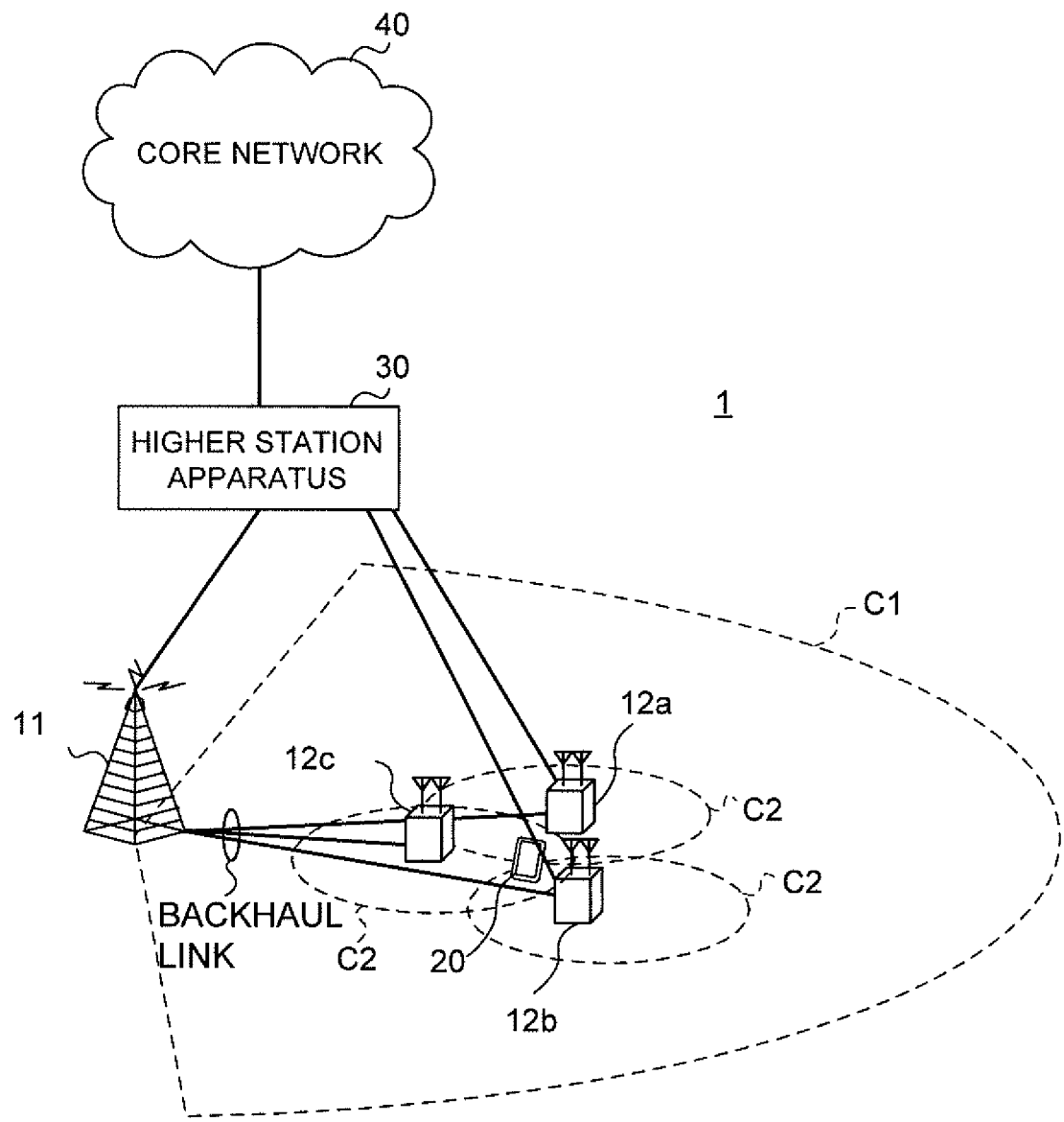
FIG. 12 is a diagram to show an exemplary schematic structure of a radio communication system according to an embodiment of the present invention.

FIG. 12 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)" and so on.

Also, the radio communication system 1 supports the UE-specific carrier operations in NR, which have been described with the above embodiments (examples 1 to 4). In this case, UE-specific carrier operations in NR may be supported so as to coexist with CA-based wideband systems, or may be supported on an NR-only basis, in accordance with the above described embodiments (at least one of examples 1 to 4).

The radio communication system 1 shown in FIG. 12 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A configuration to apply different numerologies between cells and/or within cells may be adopted here.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate by using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the configurations of the frequency band for use in each radio base station are by no means limited to these.

A structure may be employed here, in which wire connection (for example, optical fiber, which is in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmission/reception point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmission/reception points" and so on.

Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier.

SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in UL.

In the radio communication system 1, a DL shared channel (PDSCH (Physical Downlink Shared CHannel), which is also referred to as, for example, "DL data channel"), which is shared by each user terminal 20, a broadcast channel (PBCH (Physical Broadcast CHannel)), L1/L2 control channels and/or other channels are used as DL channels. User data, higher layer control information, SIBs (System Information Blocks) and so forth are communicated in the PDSCH. Also, the MIB (Master Information Block) is communicated in the PBCH.

The L1/L2 control channels include DL control channels (PDCCH (Physical Downlink Control CHannel), EPDCCH (Enhanced Physical Downlink Control CHannel), PCFICH (Physical Control Format Indicator CHannel), PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, a UL shared channel (PUSCH (Physical Uplink Shared CHannel), which is also referred to as a "UL data channel" and so on), which is shared by each user terminal 20, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

UE-specific carrier operations (at least one of examples 1 to 4 in the above embodiments) are supported in NR between radio base stations 11 and 12 and user terminals 20.

(Radio Base Station)

Figure 13:
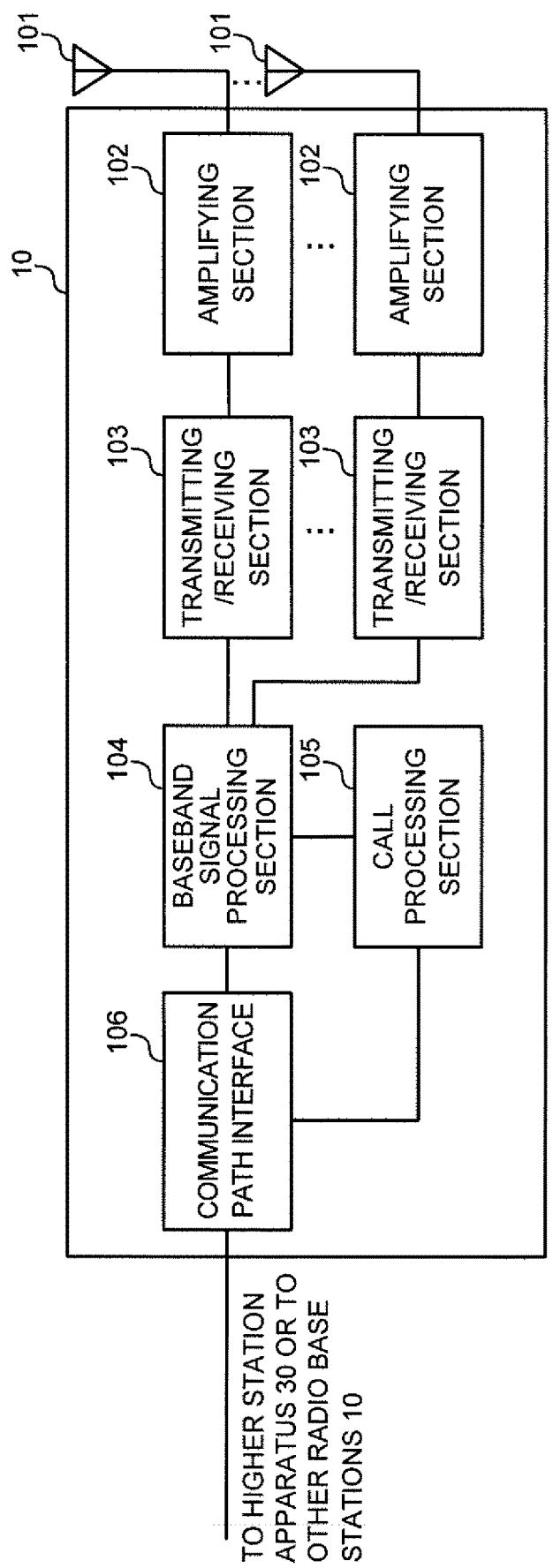
FIG. 13 is a diagram to show an exemplary overall structure of a radio base station according to the present embodiment.

FIG. 13 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including, for example, at least one of a PDCP (Packet Data Convergence Protocol) layer process, division and coupling of user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to the transmitting/receiving sections 103. Furthermore, downlink control signals are also subjected to transmission processes such as channel coding and/or an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing of communication channels, manages the state of the radio base station 10 and manages radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, optical fiber, which is in compliance with the CPRI (Common Public Radio Interface), the X2 interface, etc.).

In addition, the transmitting/receiving sections 103 receive UE capability information, and send this information to the baseband signal processing section 104. In addition, the transmitting/receiving sections 103 transmit band information, which is sent from the baseband signal processing section 104, to the user terminals 20.

Figure 14:
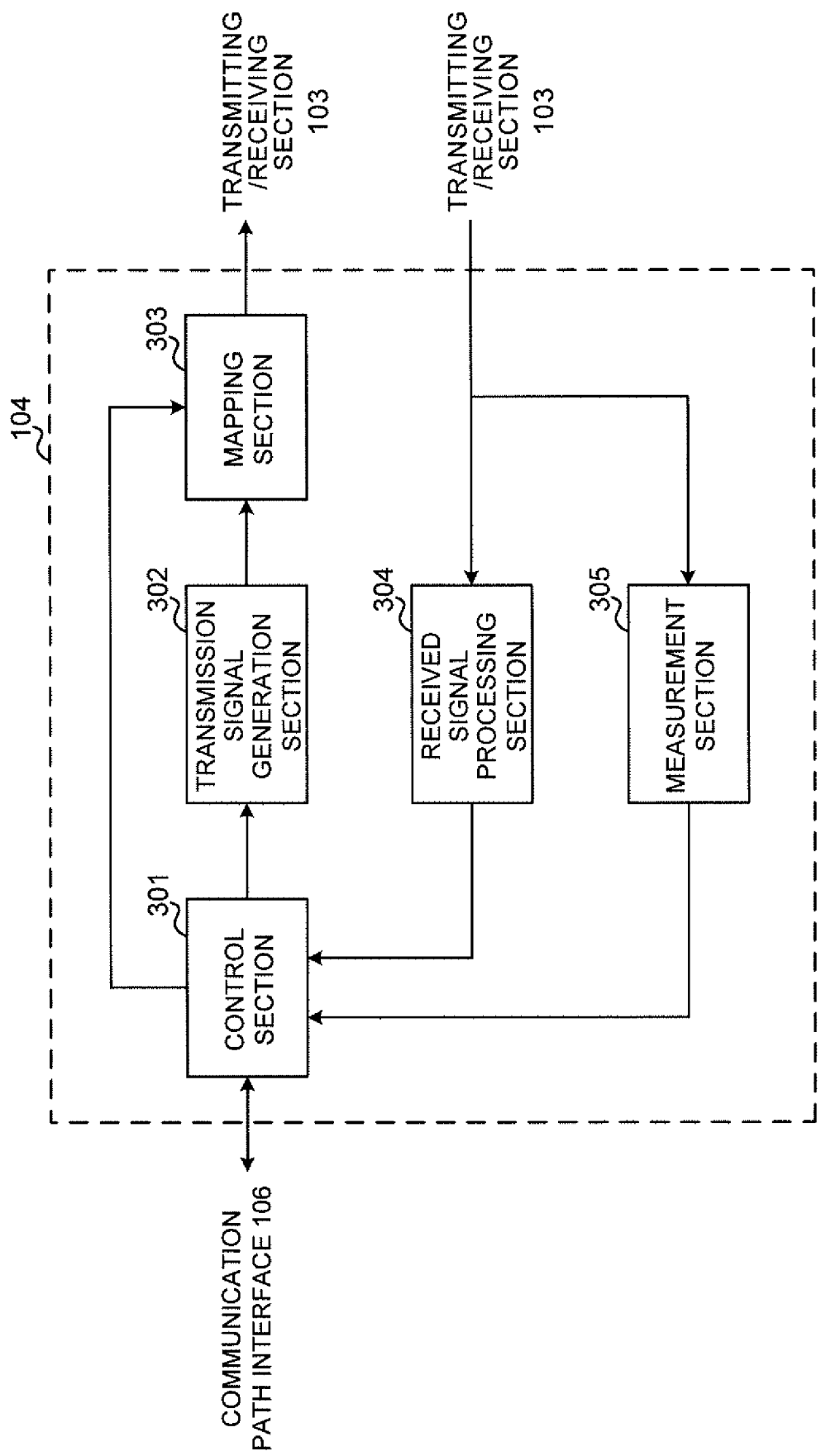
FIG. 14 is a diagram to show an exemplary functional structure of a radio base station according to the present embodiment.

FIG. 14 is a diagram to show an exemplary functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of DL signals in the transmission signal generation section 302, mapping of DL signals in the mapping section 303, receiving processes (for example, demodulation) for UL signals in the received signal processing section 304, and measurements in the measurement section 305.

For example, the control section 301 exerts control so that at least one of examples 1 to 4 in the above embodiments is supported.

The control section 301 can be constituted by a controller, a control circuit or control apparatus that can be described based on general understanding of the technical field to which the present invention pertains.

The transmission signal generation section 302 generates DL signals (including DL data, scheduling information, short TTI configuration information and so on) as commanded by the control section 301, and outputs these signals to the mapping section 303.

The transmission signal generation section 302 can be constituted by a signal generator, a signal generation circuit or signal generation apparatus that can be described based on general understanding of the technical field to which the present invention pertains.

The mapping section 303 maps the DL signals generated in the transmission signal generation section 302 to predetermined radio resources as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) for UL signals transmitted from the user terminals 20 (including, for example, UL data signals, UL control signals, UL reference signals, UCI, short TTI support information and so forth). To be more specific, the received signal processing section 304 performs UL signal receiving processes based on the numerologies configured in the user terminals 20. To be more specific, the received signal processing section 304 may output the received signals and/or the signals after receiving processes to the measurement section 305. In addition, the received signal processing section 304 performs receiving processes for A/Ns that arrive in response to DL signals, and outputs ACKs or NACKs to the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the channel quality of the UL based on, for example, the received power (for example, RSRP (Reference Signal Received Power)) and/or the received quality (for example, RSRQ (Reference Signal Received Quality)) of UL reference signals. The measurement results may be output to the control section 301.

Figure 15:
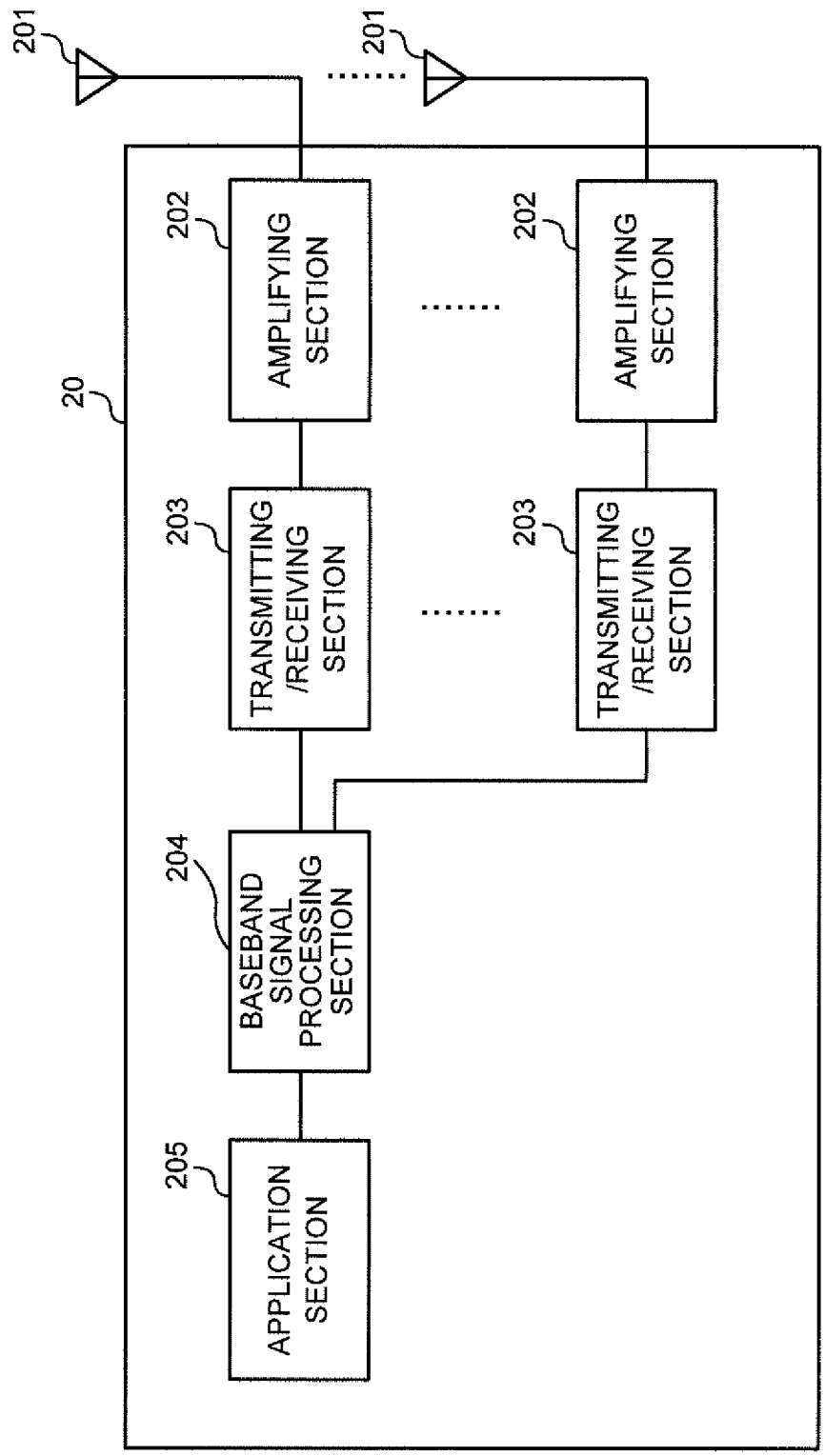
FIG. 15 is a diagram to show an exemplary overall structure of a user terminal according to the present embodiment.

(User Terminal) FIG. 15 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

The baseband signal processing section 204 performs receiving processes for the baseband signal that is input, including at least one of an FFT process, error correction decoding, a retransmission control receiving process and so on. DL data is forwarded to the application section 205. The application section 205 performs processes related to higher layers above the physical layer and the MAC layer, and/or other processes. Also, the broadcast information is also forwarded to application section 205.

Meanwhile, UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, etc.) is also subjected to channel encoding, rate matching, puncturing, DFT process, IFFT process and so on, and forwarded to each transmitting/receiving section 203.

The baseband signal processing section 204 may have signal sequences for a number of bandwidths, for example, as in sample UE designs 1 and 2, which have been described earlier.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

In addition, the transmitting/receiving sections 203 receive band information and transmit this information to the baseband signal processing section 204. In addition, the transmitting/receiving sections 203 transmit UE capability information, which is transmitted from the baseband signal processing section 204, to radio base stations 11 and 12. Here, the band information represents a DL band candidate, which is a band where downlink (DL) signals might be allocated, and/or a UL band candidate, which is a band where uplink (UL) signals might be allocated.

Also, the transmitting/receiving sections 203 receive broadcast signals in frequency resources corresponding to frequency rasters where synchronization signals are detected.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 16:
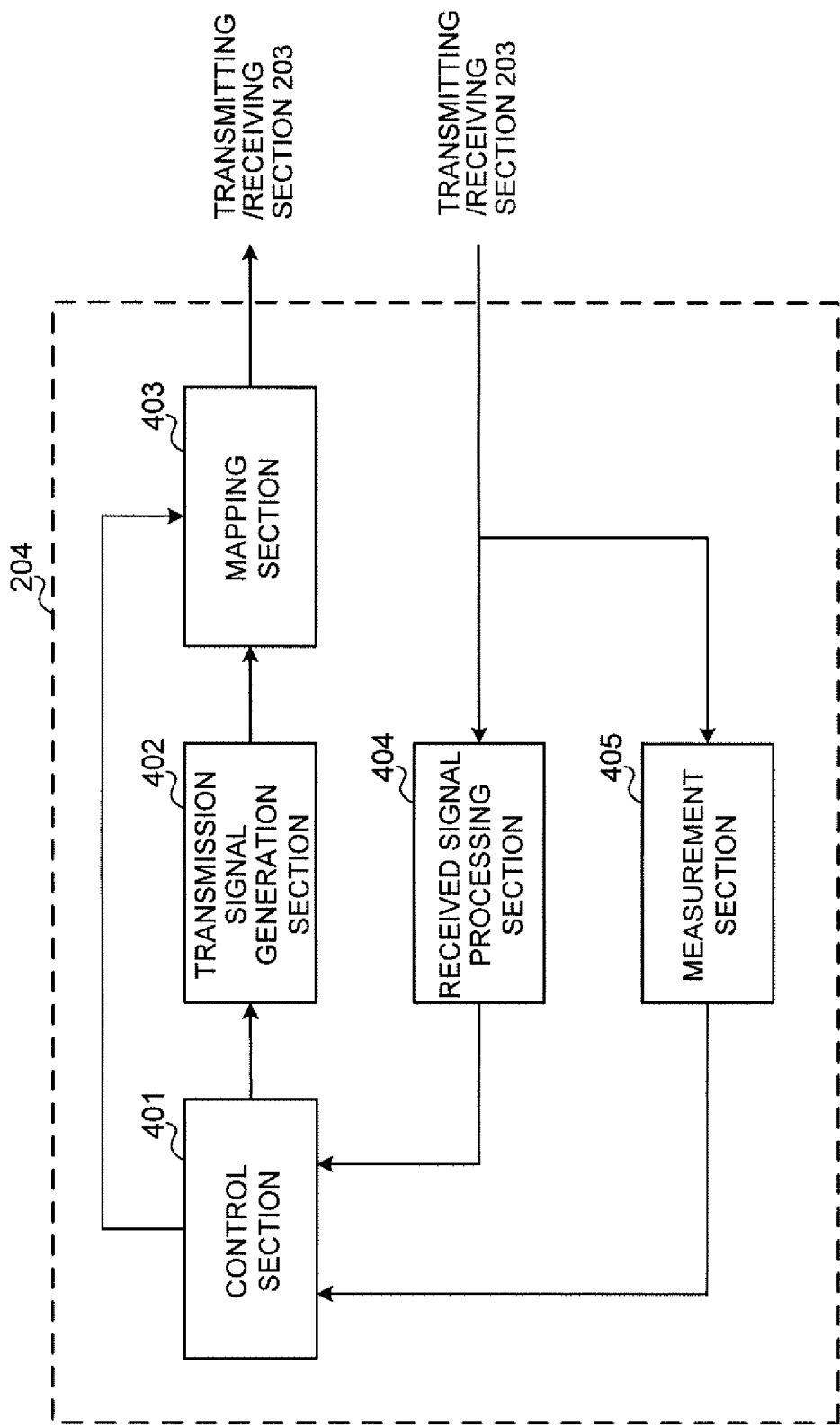
FIG. 16 is a diagram to show an exemplary functional structure of a user terminal according to the present embodiment.

FIG. 16 is a diagram to show an exemplary functional structure of a user terminal according to the present embodiment. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, receiving processes for DL signals in the received signal processing section 404 and measurements in the measurement section 405.

In addition, the control section 401 exerts control so that at least one of examples 1 to 4 in the above embodiment is supported. To be more specific, the control section 401 configures a DL band candidate and/or a UL band candidate based on band information, in a user terminal-specific manner. In addition, the control section 401 transmits capability information that shows the bandwidth for the DL band candidate and/or the UL band candidate which the user terminal can support.

Further, the control section 401 controls at least one of receipt of system information, the random access process and RRM (Radio Resource Management) measurements, in frequency resources corresponding to frequency rasters where synchronization signals are detected.

In addition, the control section 401 configures the frequency resources to use to receive common control signals and/or to transmit random access signals for each user terminal or for each group comprised of user terminals.

Also, the control section 401 configures at least one frequency resource that can be used for RRM (Radio Resource Management) measurements inside and/or outside the above DL band candidate.

The control section 401 can be constituted by a controller, a control circuit or control apparatus that can be described based on general understanding of the technical field to which the present invention pertains.

In the transmission signal generation section 402, UL signals (including UL data signals, UL control signals, UL reference signals, UCI, short TTI support information, etc.) are generated (through, for example, encoding, rate matching, puncturing, modulation and so on) as commanded by the control section 401, and output to the mapping section 403. The transmission signal generation section 402 can be constituted by a signal generator, a signal generation circuit or signal generation apparatus that can be described based on general understanding of the technical field to which the present invention pertains.

The mapping section 403 maps the UL signals generated in the transmission signal generation section 402 to predetermined radio resources, as commanded by the control section 301, and outputs these to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) for DL signals (including DL data signals, scheduling information, DL control signals, DL reference signals, short TTI configuration information and so forth). The received signal processing section 404 outputs the information received from the radio base station 10, to the control section 401. The received signal processing section 404 outputs, for example, broadcast information, system information, higher layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiment show blocks in functional units. These functional blocks (components) may be implemented in arbitrary combinations of hardware and/or software. Also, means for implementing each functional block is not particularly limited. That is, each functional block may be realized by one piece of apparatus that is physically and/or logically aggregated, or may be realized by connecting two or more physically and/or logically separate pieces of apparatus directly and/or indirectly (by using cables and/or by radio) and using these multiple pieces of apparatus.

Figure 17:
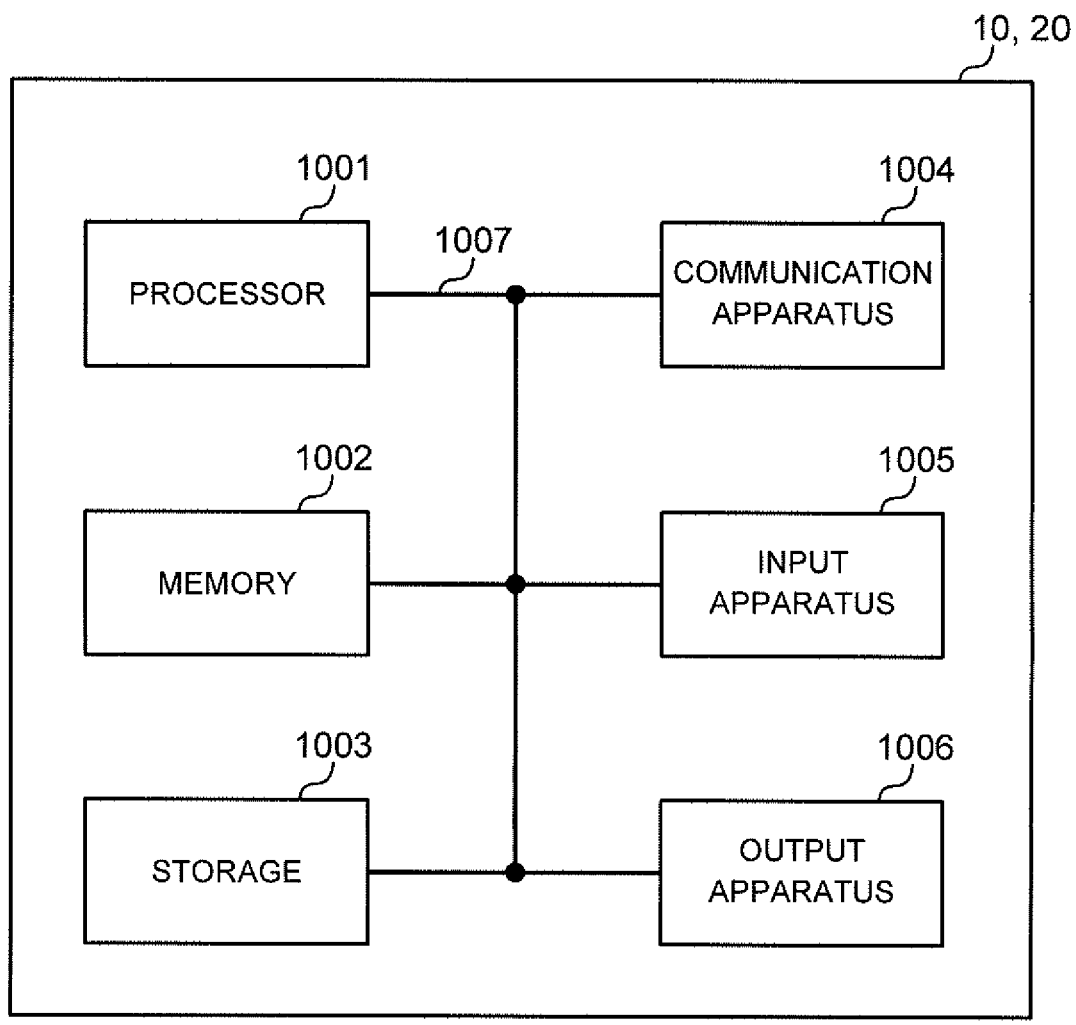
FIG. 17 is a diagram to show an exemplary hardware structure of a radio base station and a user terminal according to the present embodiment.

That is, a radio base station, a user terminal and so on according to an embodiment of the present invention may function as a computer that executes the processes of the radio communication method of the present invention. FIG. 17 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary from apparatus to apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations) Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," or one slot may be referred to as a "TTI." That is, a subframe and/or a TTI may be a subframe (I ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit for channel-encoded data packets (transport blocks), code blocks and/or codewords, or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," a "short subframe," and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI long. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are simply examples. For example, configurations such as the number of subframes included in a radio frame, the number of slots included in a subframe, the number of symbols and RBs included in a slot, the number of subcarriers included in an RB, the number of symbols in a TTI, the duration of symbols, the length of cyclic prefixes (CPs) and so on can be changed in a variety of ways.

Also, the information, parameters and so forth described in this specification may be represented in absolute values or in relative values with respect to predetermined values, or may be represented using other applicable information. For example, radio resources may be specified by predetermined indices. In addition, equations to use these parameters and so on may be used, apart from those explicitly disclosed in this specification.

The names used for parameters and/or others in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each example/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency range, the microwave range and/or the optical (both visible and invisible) range.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-192335, filed on Sep. 29, 2016, including the specification, drawings and abstract, is incorporated herein by reference in its entirety.

The invention claimed is:

1. A terminal comprising:
a receiver that receives a broadcast channel in a resource corresponding to a frequency raster, the frequency raster indicating a frequency position of a synchronization signal;
a processor that controls a Radio Resource Management (RRM) measurement by using the resource; and
a transmitter that transmits a first ability information indicating a maximum bandwidth for a downlink band candidate and a second ability information indicating a maximum bandwidth for an uplink band candidate,
wherein the receiver further receives a first band information configuring the downlink band candidate and a second band information configuring the uplink band candidate, and
wherein the receiver further receives information, by higher layer signaling, indicating a frequency resource, which is within the uplink band candidate configured by the second band information, for transmission of a random access signal, the frequency resource being configured per group including multiple terminals and being separate from the resource corresponding to the frequency raster and the processor controls transmission of a random access signal in the frequency resource.

2. The terminal according to claim 1, wherein the resource does not overlap in a frequency domain with a band for receiving a common control signal.

3. The terminal according to claim 1, wherein
the receiver receives, by higher layer signaling, information configuring a plurality of candidates of the first band information and information configuring a plurality of candidates of the second band information, and
the processor switches, based on a first indication included in a first downlink control information (DCI), the downlink band candidate between the plurality of candidates of the first band information, and switches, based on a second indication included in a second DCI, the uplink band candidate between the plurality of candidates of the second band information.

4. A radio communication method for a terminal, comprising:
receiving a broadcast channel in a resource corresponding to a frequency raster, the frequency raster indicating a frequency position of a synchronization signal;
controlling a Radio Resource Management (RRM) measurement by using the resource;
transmitting a first ability information indicating a maximum bandwidth for a downlink band candidate and a second ability information indicating a maximum bandwidth for an uplink band candidate;
further receiving a first band information configuring the downlink band candidate and a second band information configuring the uplink band candidate;
further receiving information, by higher layer signaling, indicating a frequency resource which is within the uplink band candidate configured by the second band information, for transmission of a random access signal, the frequency resource being configured per group including multiple terminals and being separate from the resource corresponding to the frequency raster; and
controlling transmission of a random access signal in the frequency resource.

5. A base station comprising:
a transmitter that transmits a broadcast channel in a resource corresponding to a frequency raster, the frequency raster indicating a frequency position of a synchronization signal;
a processor that controls a reception of a report of a Radio Resource Management (RRM) measurement by using the resource; and
a receiver that receives a first ability information indicating a maximum bandwidth for a downlink band candidate and a second ability information indicating a maximum bandwidth for an uplink band candidate,
wherein the transmitter further transmits a first band information configuring the downlink band candidate and a second band information configuring the uplink band candidate, and
wherein the transmitter further transmits information, by higher layer signaling, indicating a frequency resource, which is within the uplink band candidate configured by the second band information, for reception of a random access signal, the frequency resource being configured per group including multiple terminals and being separate from the resource corresponding to the frequency raster and the processor controls reception of a random access signal in the frequency resource.

6. A radio communication system comprising a base station and a terminal, wherein
the base station comprises:
a first transmitter that transmits a broadcast channel in a resource corresponding to a frequency raster, the frequency raster indicating a frequency position of a synchronization signal;
a first processor that controls a reception of a report of a Radio Resource Management (RRM) measurement by using the resource; and
a first receiver that receives a first ability information indicating a maximum bandwidth for a downlink band candidate and a second ability information indicating a maximum bandwidth for an uplink band candidate,
wherein the first transmitter further transmits a first band information configuring the downlink band candidate and a second band information configuring the uplink band candidate, and
wherein the first transmitter further transmits information, by higher layer signaling, indicating a frequency resource, which is within the uplink band candidate configured by the second band information, for reception of a random access signal, the frequency resource being configured per group including multiple terminals and being separate from the resource corresponding to the frequency raster and the first processor controls reception of a random access signal in the frequency resource; and
the terminal comprises:
a second receiver that receives the broadcast channel in the resource corresponding to the frequency raster, the frequency raster indicating the frequency position of the synchronization signal;
a second processor that controls the RRM measurement by using the resource; and a second transmitter that transmits the first ability information indicating the maximum bandwidth for the downlink band candidate and the second ability information indicating the maximum bandwidth for the uplink band candidate, wherein the second receiver further receives the first band information configuring the downlink band candidate and the second band information configuring the uplink band candidate, and wherein the second receiver further receives the information, by the higher layer signaling, indicating the frequency resource, which is within the uplink band candidate configured by the second band information, for transmission of the random access signal, the frequency resource being configured per group including the multiple terminals and being separate from the resource corresponding to the frequency raster and the second processor controls transmission of the random access signal in the frequency resource.

* * * * *